United States Patent Office 3,062,773
Patented Nov. 6, 1962

3,062,773
AMINO-POLYAMIDE RESIN AND REACTION PRODUCT THEREOF WITH AN EPOXY RESIN
Edgar R. Rogier, Hopkins, Minn., assignor to General Mills, Inc., a corporation of Delaware
No Drawing. Filed July 13, 1959, Ser. No. 826,476
8 Claims. (Cl. 260—42)

This invention relates to new and useful polyamides prepared from polyamines and polycarboxylic fatty acids.

One object of this invention is to disclose polyamides that are useful as adhesives, castings, protective coatings, and other similar applications.

Another object of this invention is to disclose polyamides having a high amine number.

Still another object of this invention is to disclose polyamides that are suitable for curing epoxy resins.

Recent developments in the applications of polyamides have taught the value of having polyamides which contain a relatively large proportion of unreacted amine groups. These polyamides are requently referred to as "amino-polyamides." Therefore, another object of this invention is to disclose a new type of amino-polyamide.

Other objects and advantages to the teachings of this invention will become apparent upon reading the subsequent specification.

It has now been discovered that polyamides resulting from the reaction of a polyamine and a particular type of polycarboxylic fatty acid are useful in the manner set forth above.

The polycarboxylic acids which may be employed in this invention are those acids obtained by the addition of carbon monoxide to unsaturated higher fatty acids. There are various methods of preparing such polycarboxylic acids. One method of preparation is the addition of carbon monoxide and water in the presence of a suitable catalyst such as nickel catalysts as shown in Reppe and Kroper, Ann. 582, 63–65 (1953). The reaction involved is illustrated graphically below, showing the addition of the carbon monoxide to the double bond of the fatty acid:

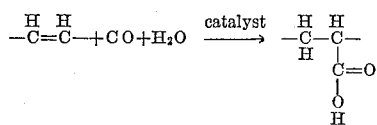

The reaction is generally carried out in the presence of nickel catalysts such as $Ni(CO)_4$ at temperatures of about 270° C. and pressures of about 200 atmospheres. When oleic acid is used as a starting material the final product is a mixture of $C_{19}$ dicarboxylic acids comprising substantially the 1,10 or 1,11 $C_{19}$ dicarboxylic acid with some monocarboxylic acids present. Because of some bond migration which occurs the dicarboxylic acid portion will be a mixture of isomers of $C_{19}$ dicarboxylic acids. If polyunsaturated acids are used as a starting material the resulting dicarboxylic acid mixture may contain unsaturated as well as saturated dicarboxylic acids.

An alternative method is to react the carbon monoxide and unsaturated fatty acid in the presence of hydrogen and a suitable catalyst such as cobalt carbonyl to get the aldehyde or alcohol or mixtures thereof which can then be oxidized to the acid as shown below:

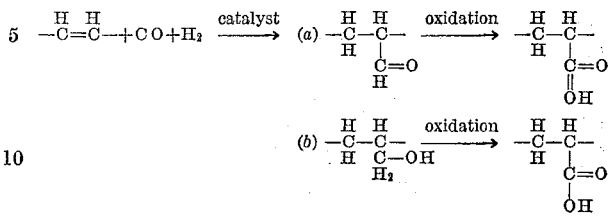

This reaction is generally carried out in the presence of cobalt catalysts at temperatures in the range of 300 to 400° F. and pressures within the range of 2500 to 4000 p.s.i.g. Again starting with oleic acid the final product will be a mixture of isomers of saturated $C_{19}$ dicarboxylic acid. Even if polyunsaturated acids are used as a starting material, only saturated dicarboxylic acids will result since the hydrogen present will add at double bonds or points of unsaturation. The final product is therefore substantially a mixture of isomers of saturated dicarboxylic acids, in which a carboxyl group has been added across a point of unsaturation. Only dicarboxylic acids result with very little, if any, tricarboxylic acid formation.

Still another method of preparing the dicarboxylic acids is the reaction of unsaturated acids with carbon monoxide in the presence of catalysts such as sulfuric acid or hydrogen fluoride. In this method, very mild reaction conditions are required, the dicarboxylic acids forming at temperatures advantageously at room temperature or below. Pressures between 100 and 600 atmospheres may be used and preferably between 100 and 300 atmospheres are used to suppress rearrangement or bond migration. However, pressures between 30 and 100 atmospheres may conveniently be used and are preferred if rearrangement poses no particular problem. Again a mixture of isomers of dicarboxylic acids will result.

As is apparent from the foregoing discussion, a large variety of catalysts can be used. Reppe et al. shows the use of nickel catalysts. In the "oxo" process cobalt catalysts such as cobalt carbonyl is commonly used. Sulfuric acid and other catalysts such as boron trifluoride can also be used.

It is also apparent that any unsaturated higher fatty acid can be used as a starting material for providing the dicarboxylic acids. For the production of the polyamides of the present invention the $C_{14}$ to $C_{22}$ unsaturated acids may be employed. In addition to the monounsaturated acids such as oleic acid, acids such as linoleic, linolenic, ricinoleic and elaidic or mixtures thereof may be employed.

As a practical matter mixtures of these acids are commonly employed since such mixtures are readily available, for example, tall oil fatty acids. In general, sources rich in oleic and linoleic acid would commonly be used. In addition to the acids themselves the esters thereof may be used as starting materials for preparation of a polycarboxylic acid.

Since tall oil fatty acids are a readily available source of acids which are rich in oleic and linoleic acids the tall oil fatty acids were used to prepare the dicarboxylic acids employed in the preparation of the polyamides of the invention. The methyl esters of tall oil fatty acids were oxonated by the conventional "oxo" process using carbon monoxide and hydrogen in a ratio of 1:1 in the presence of .2 weight percent cobalt tallate, at a temperature of 330 to 350° F. and a pressure of 3000–4000 p.s.i.f. for 1 hour. The resulting product, which was a mixture of hydroxy esters and aldehyde esters, was then saponified and oxidized by fusion with potassium hydroxide at about 500° F., filtered, extracted with hexane, and acidified with HCl to provide a crude mixture of dicarboxylic acids, a portion of which on fractional distillation at reduced pressures separated into the following fractions:

| | Weight percent |
|---|---|
| Monobasic acid | 13 |
| Dibasic acid | 76 |
| Bottoms | 11 |

The crude diethyl esters were prepared from the crude mixture of dibasic acids by conventional esterification procedures using ethanol and benzene in the presence of an acid catalyst. The crude esters were then fractionally distilled to provide a heart fraction of a mixture of isomers of diethyl heptadecanedicarboxylate having the following properties:

| | |
|---|---|
| Boiling point | 190–200° C. at 5 mm. Hg. |
| Molecular weight (in benzene) | 365±10. |
| Refraction index ($n_D^{20}$) | 1.4490. |
| Acid No. | 7.9. |
| Sap. eq. (in ethylene glycol) | [1] 209 (197.1). |
| Iodine No. | 4.5. |
| Aldehyde or $C_{21}$ aldehyde ester | Less than 3 weight percent. |
| Alcohol or $C_{21}$ alcohol ester | 2.3 weight percent. |
| Percent unsap | 0.6 |

[1] The sap. eq. obtained by the usual method was 209. It appeared that the conditions of the usual method for determining sap. eq. were not sufficiently drastic to bring about complete saponification of the branched hindered carboxylic ester grouping. Accordingly, a modified procedure was used in which the sample was heated under reflux in a solution of 1 N KOH for 3 hours. With this modification of the usual method the sap. eq. obtained was 197.1.

| Analysis | Found, percent | Calculated (for $C_{22}H_{44}O_2$), percent |
|---|---|---|
| C | 72.35 | 72.03 |
| H | 11.64 | 11.53 |
| O | 16.38 | 16.64 |

To obtain the acids the diethyl esters were saponified with sodium hydroxide in a sealed autoclave at 265 to 275° C. for 2 hours. The resulting soaps were acidified with HCl, extracted with hexane and distilled in vacuo to provide a mixture of dicarboxylic acids having the following properties:

| | |
|---|---|
| Boiling point | 220–232° C. at 0.2–0.6 mm. Hg. |
| $n_D^{30}$ | 1.4610. |
| Neutralization equivalent | 172.4. |

The dimethyl esters of the acids were prepared from the crude mixture of acids previously described by esterification with methanol by conventional esterification procedures. The crude dimethyl esters were then fractionally distilled to provide a heart cut fraction having a saponification equivalent of 192 as determined by conventional methods and 181.3 as determined by the modified procedure previously noted.

As tall oil fatty acids contain $C_{16}$ acids and $C_{18}$ fatty acids such as oleic and linoleic acid the final product resulting from the tall oil fatty acids in substantially a mixture of isomers of $C_{19}$ with some $C_{17}$ dicarboxylic acids. While the tall oil fatty acids were used as the convenient and economical source of fatty acids, it is to be understood that any unsaturated fatty acids may be used as starting materials for the preparation of the dicarboxylic acids which are then used for the preparation of the polyamides of this invention. Any of the unsaturated fatty acids or the esters thereof having from $C_{14}$–$C_{22}$ carbon atoms may therefore be used to prepare the dicarboxylic acids used for the preparation of the polyamides. The polyamides prepared from these acids or the alkyl esters thereof will form a common group, having similar properties and characteristics. Other sources rich in oleic acid, linoleic acid, linolenic acid or the esters thereof may be used such as soya bean oil, linseed oil, cottonseed oil, red oil, and the like.

Accordingly, therefore, the acids or esters thereof which may be employed in preparing the polyamides of the present invention are a mixture of isomers having the following general formula:

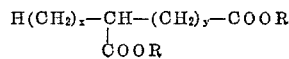

where R is hydrogen or an alkyl radical having from 1 to 12 carbon atoms, $x$ and $y$ are integers from 5 to 11 and the sum of $x$ and $y$ totals from 12 to 20.

As a practical matter since the most common acids available for the preparation of the dicarboxylic acids are the $C_{18}$ acids, the preferred materials for the preparation of the present polyamides are those having the formula shown above in which $x$ and $y$ total 16.

Suitable polyamines useful in this invention are illustrated by the structural formula $H_2NR(NHR)_nNH_2$ where R is an alkylene radical containing 2 to 4 carbon atoms and $n$ is an integer from 1 to 4.

Illustrative of these polyamines are diethylene triamine, triethylene tetramine, tetraethylene pentamine, di-1,3-propane triamine, tri-1,3-propane tetramine, di-1,2-propane triamine and analogues thereof.

The amidification reaction may be carried out under the usual conditions employed for this purpose. Generally this involves reaction at about 200° C. for approximately 3 hours. Under these conditions polyamides having amine number of 400 or higher may be prepared. Preferably the polyamides have an amine number in the range of 75 to 400. The amine number referred to herein is the number of milligrams of potassium hydroxide equivalent to the amine groups in one gram of product. The polyamides derived from diethylene triamine generally have low amine numbers in the range of 75 to 250.

Briefly the polyamides are prepared by reacting the polycarboxylic acid with an excess of a polyalkylene polyamine at a temperature in the range of 150 to 290° C. preferably 200 to 230° C., for about 2 to 4 hours.

It has further been discovered that the amino polyamides of this invention are especially useful when employed in combination with epoxy resins. For instance, coatings prepared from these compositions are extremely resistant to aromatic solvents.

The epoxy resins (glycidyl polyethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents No. 2,585,115 and No. 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p- hydroxy phenyl) propane (Bisphenol A), the resin having the following theoretical structural formula,

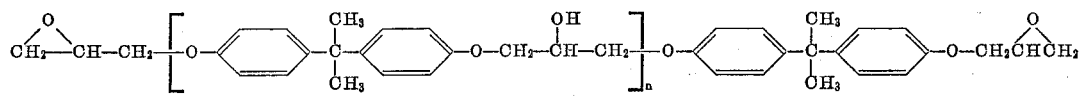

where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one mole of the epoxy group or one gram-equivalent of epoxide. The preferred epoxy equivalency for use in this invention is in the range of 140 to 1000.

This invention may be further illustrated by reference to the following examples in which all "parts" are expressed as parts by weight.

*Example I*

105.1 parts of a mixture of isomers heptadecanedicarboxylic acid (neutralization equivalent=172.4) prepared by the saponification and acidification of the diethyl esters of heptadecanedicarboxylic acid previously described and 67 parts of diethylene triamine (neutralization equivalent=35.3) were placed in a reaction vessel equipped with a stirrer and distillation head. The temperature of this mixture was gradually raised to 205° C. over a period of one hour. The temperature was then rapidly increased to 225° C. and held at this point for 2 hours. During this period 15.6 parts of a distillate was collected. The reaction mixture was then heated under water pump vacuum at 230° C. for 1.25 hours. The resulting polyamide resin had the following properties:

Amine number_____ 242.0
Acid number_____ 2.1
Gardner-Holdt viscosity [1]_____ A–3
Gardner color [1]_____ 8–9

[1] 35% by weight solution in a 1:1 solution of n-butanol-toluene.

Various castings were prepared by curing the above resin with an epoxy resin obtained by reacting Bisphenol A and epichlorohydrin having an epoxy equivalency of about 185. This curing was carried out for 3.25 hours at 120 to 125° C. and the combinations shown below were compatible throughout this curing.

| Parts of the "Polyamide" | Parts Epoxy Resin | Barcol Hardness |
|---|---|---|
| 60 | 40 | 56 |
| 50 | 50 | 63 |
| 40 | 60 | 72 |
| 30 | 70 | 75 |

These castings were clear, hard, abrasive resistant and extremely tough, in addition to having a desirable Barcol hardness as shown above. Use of this polyamide as a protective coating indicated it had exceptional resistance to aviation gas, toluene, and oleic acid.

*Example II*

103.7 parts of the mixture of isomers of dimethyl heptadecanedicarboxylate previously noted (sap. eq.=192 by conventional method and 181.3 by modified method previously described), and 28.6 parts of diethylene triamine (neut. eq.=35.5) were heated at 225° C. for two hours during which time 15.5 parts of distillate (amino No.=38) was collected. The reaction mixture was then held under vacuum (8 mm.) at 200° C. for one hour during which time 2.7 parts of distillate (amino No.=115) was collected in a Dry-Ice trap.

The resulting balsamic resin had the following properties:

Amino No_____ 132
Gardner-Holdt viscosity [1]_____ D–E
Gardner color [1]_____ 9–10

[1] 35% (by weight) solution in n-butanol-toluene (1:1).

Mixtures of this polyamide and Epon 1001, a product of Shell Chemical Company, in the ratios of 35:65, 50:50 and 25:75 (parts polyamide:parts Epon 1001) had Barcol hardnesses after air drying for 4 days of 42, 60, and 68, respectively.

*Example III*

103.6 parts of the mixture of isomers of dimethyl heptadecanedicarboxylate used in Example II and 55.8 parts of triethylene tetramine (neut. eq.=39.0) were heated at 225° C. for 2⅓ hours during which time 15.6 g. of distillate (amino No.=42) was collected. The reaction mixture was then held under vacuum (20–22 inches of mercury) for two hours during which time 1.3 parts of distillate (amino No.=39) was collected in a Dry-Ice trap. The resulting light, colored balsamic resin had the following properties:

Amine No_____ 307
Brookfield viscosity at 40° C_____poises__ 2,500

A coating prepared from a mixture of 25 parts of this polyamide and 75 parts of an epoxy resin having an epoxy equivalency of about 475 prepared from Bisphenol A and epichlorohydrin had a Barcol hardness of 40 after air drying for 1 day and 60 after air drying for 4 days. Baked coatings prepared from this mixture were also superior in their resistance to 20% NaOH, 37% $H_2SO_4$, aviation gas, toluene, and oleic acid after immersion overnight.

*Example IV*

102.8 g. of the mixture of isomers of dimethyl heptadecanedicarboxylate used in Example II, 39.4 g. of diethylene triamine, 19.6 g. of triethylene tetramine and 14.5 g. of tetraethylene pentamine were heated at 220° C. for two hours and 50 minutes during which time 21.3 g. of distillate (amine No.=644) was collected. The reaction mixture was then held under reduced pressure (25 inches of mercury) at 200° C. for 35 minutes, during which time 4.6 g. of distillate (amine No.=402) was collected in a Dry-Ice trap. The resulting resin had the following properties:

Amine No_____ 283
Brookfield viscosity at 40° C_____poises__ 75
Gardner color_____ 6–7

The following castings were prepared from this aminopolyamide and an epoxy resin having an epoxy equivalency of about 200 by curing the various mixtures at 150° C. for 1.25 hours:

| Sample No. | Ratio Polyamide to Epoxy Resin | Barcol Hardness | Heat Distortion Temperature | Flexural Ultimate (p.s.i.) |
|---|---|---|---|---|
| 1 | 40:60 | 66 | 74 | 13,230 |
| 2 | 35:65 | 69 | 88 | 13,880 |
| 3 | 30:70 | 71 | 94 | 11,190 |
| 4 | 25:75 | 72 | 96 | 7,940 |
| 5 | 30:80 | 75 | 89 | 14,320 |

I claim as my invention:

1. An amino-polyamide resulting from the reaction of a polyamine having the structural formula $$H_2NR(NHR)_nNH_2$$

where R is an alkylene radical containing from 2 to 4 carbon atoms and $n$ is an integer from 1 to 4 and a mixture of isomers of amide forming compounds selected from the group consisting of polycarboxylic acids and the esters thereof having the structural formula $$H(CH_2)_x\text{---}CH\text{---}(CH_2)_y\text{---}COOR$$
$$|$$
$$COOR$$

where R is selected from the group consisting of hydrogen and an alkyl radical having from 1 to 12 carbon atoms, $x$ and $y$ are integers from 5 to 11 and the sum of $x$ and $y$ totals 12 to 20.

2. A polyamide as defined in claim 1 wherein the total of $x$ and $y$ is 16.

3. An amino-polyamide as defined in claim 2 having an amine number of 75 to 400.

4. A composition of matter consisting of the reaction product of (a) an amino-polyamide resulting from the reaction of a polyamine having the structural formula $H_2NR(NHR)_nNH_2$ where R is an alkylene radical containing from 2 to 4 carbon atoms and $n$ is an integer from 1 to 4 and a mixture of isomers of amide forming compounds selected from the group consisting of polycarboxylic acids and the esters thereof having the structural formula $$H(CH_2)_x\text{---}CH\text{---}(CH_2)_y\text{---}COOR$$
$$|$$
$$COOR$$

where R is selected from the group consisting of hydrogen and an alkyl radical having from 1 to 12 carbon atoms, $x$ and $y$ are integers from 5 to 11 and the sum of $x$ and $y$ totals 12 to 20 and (b) an epoxy resin of a polyhydric phenol and a polyfunctional halohydrin containing terminal epoxide groups and having an epoxy equivalent weight of 140 to 1000.

5. A composition of matter as defined in claim 4 in which said epoxy resin is a polyglycidyl ether of a dihydric phenol.

6. An amino-polyamide resulting from the reaction of a mixture of isomers of aliphatic polycarboxylic acids containing at least 19 carbon atoms in which the carboxyl radicals are separated by less than 10 carbon atoms and a polyamine of the general formula $H_2NR(NHR)_nNH_2$ where R is an alkylene radical containing from 2 to 4 carbon atoms and $n$ is an integer from 1 to 4.

7. An amino-polyamide as defined in claim 6 wherein R is an ethylene radical.

8. An amino-polyamide as defined in claim 6 having an amine number in the range of 75 to 400.

References Cited in the file of this patent

UNITED STATES PATENTS

| | | |
|---|---|---|
| 2,190,770 | Carothers | Feb. 20, 1940 |
| 2,372,090 | Kirkpatrick | Mar. 20, 1945 |
| 2,760,944 | Greenlee | Aug. 28, 1956 |
| 2,840,264 | Groves | June 24, 1958 |
| 2,891,084 | Alm et al. | June 16, 1959 |
| 2,966,874 | Barr et al. | Jan. 3, 1961 |